United States Patent [19]

Henry

[11] Patent Number: 5,663,554

[45] Date of Patent: Sep. 2, 1997

[54] WEAK LENS FOCUS ADJUSTING MECHANISM BASED UPON THICKNESS OF SCANNED MATERIAL AND IMAGESETTER USING SAME

[75] Inventor: Kelley A. Henry, Woburn, Mass.

[73] Assignee: Agfa Division, Bayer Corporation, Wilmington, Mass.

[21] Appl. No.: 373,712

[22] Filed: Jan. 17, 1995

[51] Int. Cl.[6] .................................................. H01J 1/20
[52] U.S. Cl. ...................... 250/201.2; 250/201.5; 250/559.27; 359/210
[58] Field of Search ............... 250/208.1, 201.2–201.5, 250/216, 234, 235, 559.27, 559.24, 559.22; 369/44.11, 44.13, 44.16, 44.17, 44.42, 111, 112; 235/462, 472; 359/719, 726, 206, 694, 210

[56] References Cited

U.S. PATENT DOCUMENTS

| | | | |
|---|---|---|---|
| 3,932,700 | 1/1976 | Snopko | 250/201.5 |
| 4,123,166 | 10/1978 | Botcherby et al. | 359/210 |
| 4,148,587 | 4/1979 | Erdmann et al. | 250/559.22 |
| 4,152,586 | 5/1979 | Elliott et al. | 250/201.5 |
| 4,274,101 | 6/1981 | Kataoka et al. | 359/210 |
| 4,354,103 | 10/1982 | Immink et al. | 369/44.23 |
| 4,712,887 | 12/1987 | Baer | 359/210 |
| 5,253,245 | 10/1993 | Rabedeau | 359/210 |
| 5,416,757 | 5/1995 | Luecke et al. | 250/201.5 |

*Primary Examiner*—Que Le
*Attorney, Agent, or Firm*—Julie A. Krolikowski; John A. Merecki

[57] ABSTRACT

An adjustable focusing apparatus in a scanning device is used in imagesetters, scanners, and platemaking devices to focus a scanning beam on an element to be scanned. Precise focusing is achieved with the adjustable focusing apparatus to produce output images free of undesirable artifacts. The scanning device produces a beam from a light source to scan the element. An optical system focuses the beam on a particular surface within the element. The adjustable focusing apparatus adjusts the focus position of the scanning beam relative to the element according to the thickness of the element.

23 Claims, 5 Drawing Sheets

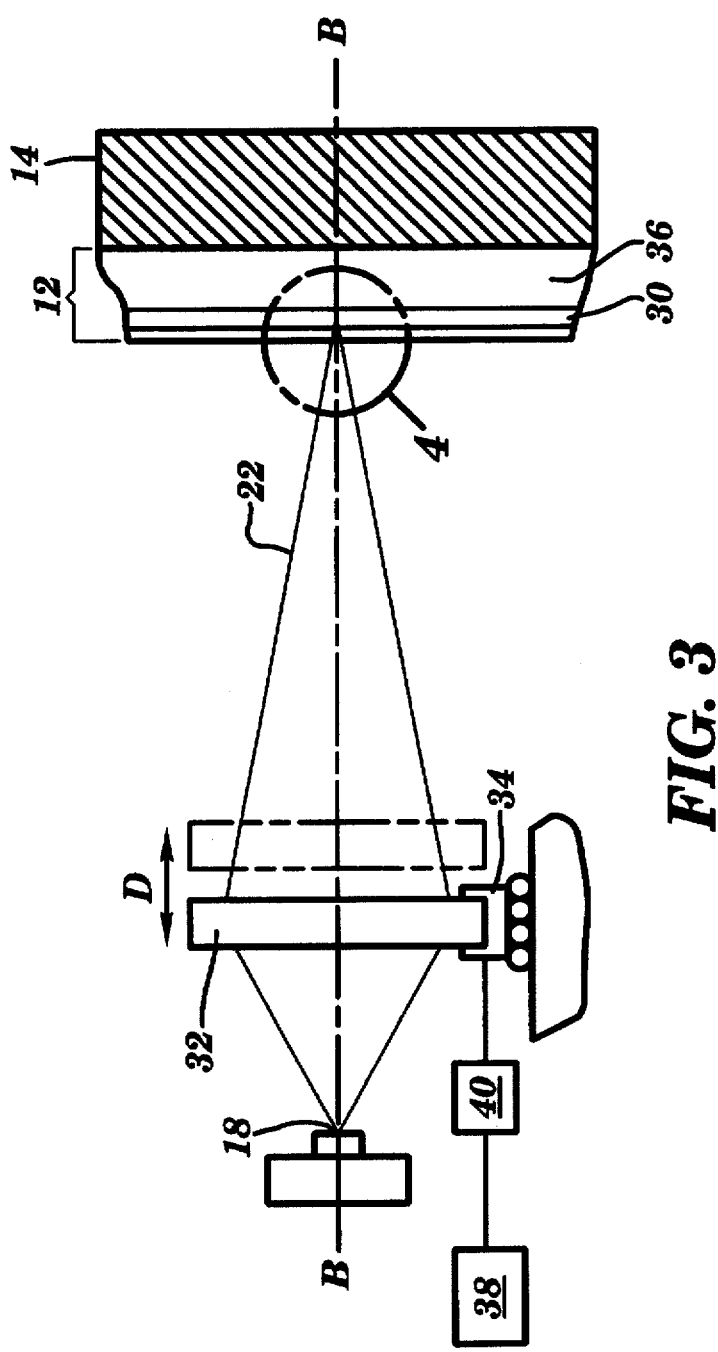
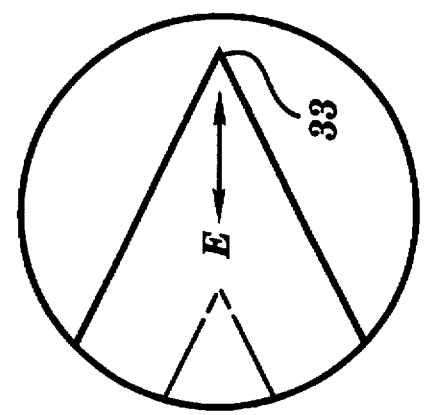
FIG. 3
FIG. 4

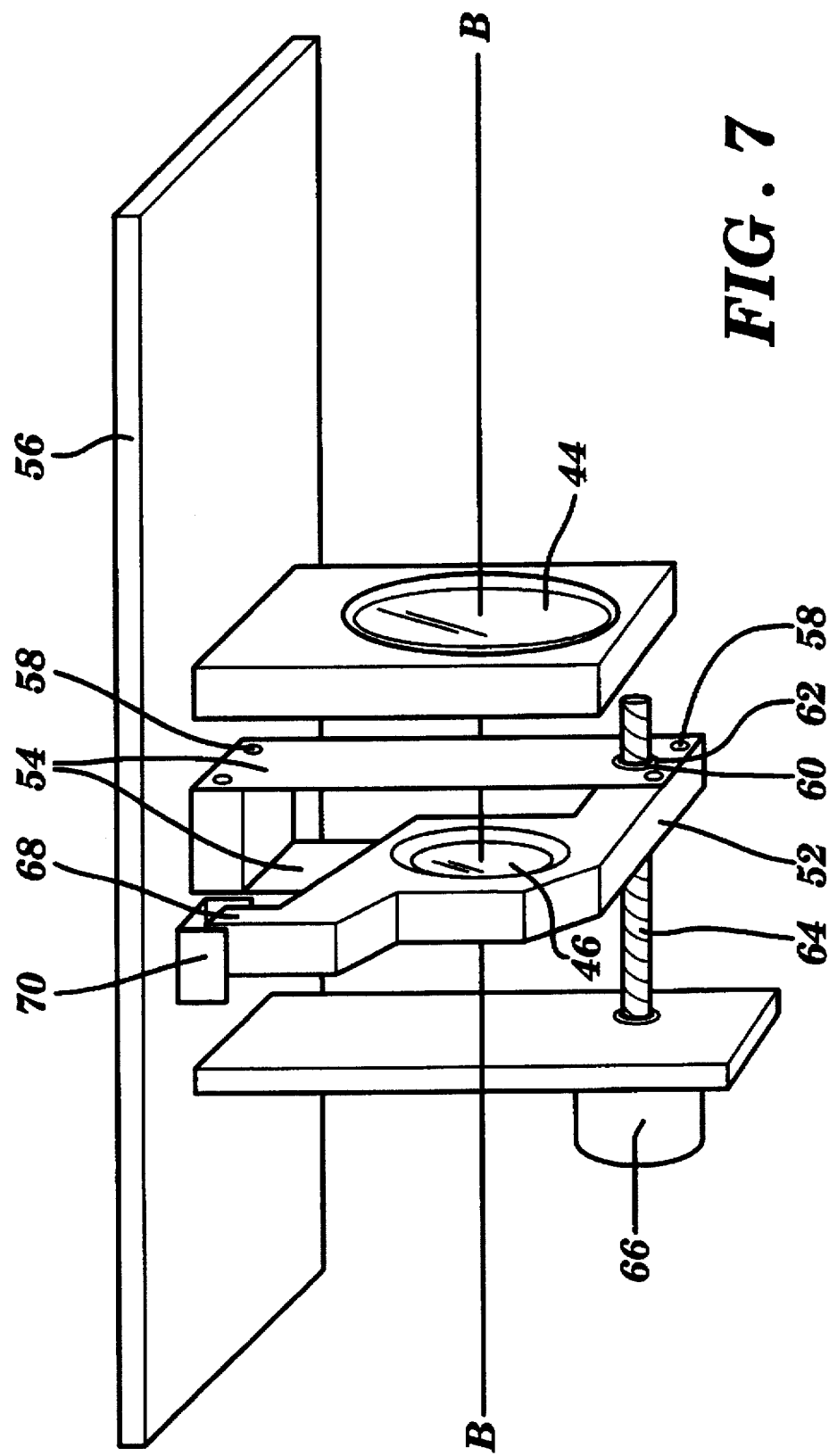

WEAK LENS FOCUS ADJUSTING MECHANISM BASED UPON THICKNESS OF SCANNED MATERIAL AND IMAGESETTER USING SAME

BACKGROUND OF THE INVENTION

The invention involves the design of optical and opto-mechanical systems. In particular the invention enhances raster output scanning and raster input scanning of images in high quality graphic arts imagesetters, plate makers and screeners in electronic prepress systems.

In electronic prepress systems, images to be printed by offset printing means are scanned from photographic sources, digitized, assembled and edited electronically at a workstation, and are then transmitted to a raster image processor or "RIP" for half-tone screening and image rasterization. The "RIP image" or the rasterized image to be printed, is then transmitted from the RIP to an imagesetter for photographic or film recording. Such an electronic prepress system is described in U.S. Pat. No. 4,004,079 and is commercially available from Miles Inc. under the trademark "COLORSCAPE".

An imagesetter typically includes a supply of unexposed photosensitive material, a recording support surface or holder for supporting the material during exposure, and an image exposing system for forming the image to be recorded according to the RIP image data. The image exposing system may employ a laser, a cathode ray tube (CRT), or a LED emitter or the like as a radiation beam source. A material handling system loads the material in web form or sheet form onto the recording support surface where the photosensitive material is scanned and exposed by the beam and a latent image is formed on the material. The material is then unloaded from the recording support surface for any subsequent chemical or mechanical processing, if necessary, depending on the material.

High resolution imagesetters and other output devices require precise focusing to obtain output images free of undesirable artifacts generally known as banding. Banding is generally a result of spacing variations between scan lines, but can also result from small variations in beam spot size on the material or image receiving surface. Relatively small system focus error coupled with any dynamic variations of scanning beam focus, such as those caused by thermal currents or air turbulence in the scanning beam path, can result in banding. Even though slightly inaccurate system focus may not have a significant effect on the beam spot size at the image receiving surface, the variation of spot size caused by dynamic variations of focus produces visible artifacts on the output image. Analysis of this banding source shows that a system focus error which causes even a 3% increase in spot size can produce about half the banding that any significantly larger system focus error can produce. If the system focus error is eliminated, the effect of dynamic variations of focus is minimized, and the source of banding accordingly reduced.

Therefore, it is an object of the present invention to provide a precise and easily adjustable system focus to eliminate inaccuracies in system focus and thereby reduce imaging artifacts.

It is accordingly an object of the present invention to adjust system focus in imagesetters, scanners, and platemakers accommodating materials of different thicknesses, to provide optimal system focus for different material thicknesses.

It is an object of the invention to provide an adjustable system focus to correct for thermal expansion or other thermal changes to the system focus.

It is an object of the invention to facilitate machine alignment and service adjustment for the focus system of an imagesetter, scanner or platemaker.

It is an object of the invention to provide an inexpensive and simple mechanism for adjusting system focus having mechanical components with loose tolerances, coarse rather than precision movements, and inexpensive optical components.

It is also an object of the present invention to allow for adjustments in system focus in an imagesetter, platemaker, or scanner by remote control or computer command.

SUMMARY OF THE INVENTION

A method and apparatus for focusing a scanning beam on an element to be scanned comprises producing a beam from a beam source, supporting the element to be scanned by the beam, focusing the beam on a particular surface in the element with an optical means, and adjusting the focus position of the scanning beam relative to the element, for example according to the thickness of the element.

BRIEF DESCRIPTION OF THE DRAWINGS

The features and objects of the invention will become apparent in the following description taken with the accompanying drawings, in which:

FIG. 3 is a diagrammatic view of a scanning system with a coarse focusing system according to a first embodiment of the present invention.

FIG. 4 is an enlarged view of section 4 in FIG. 3.

FIG. 7 is an isometric view of a coarse adjustment mechanism for fine focusing according to the present invention.

DETAILED DESCRIPTION OF THE INVENTION

Figure 1:
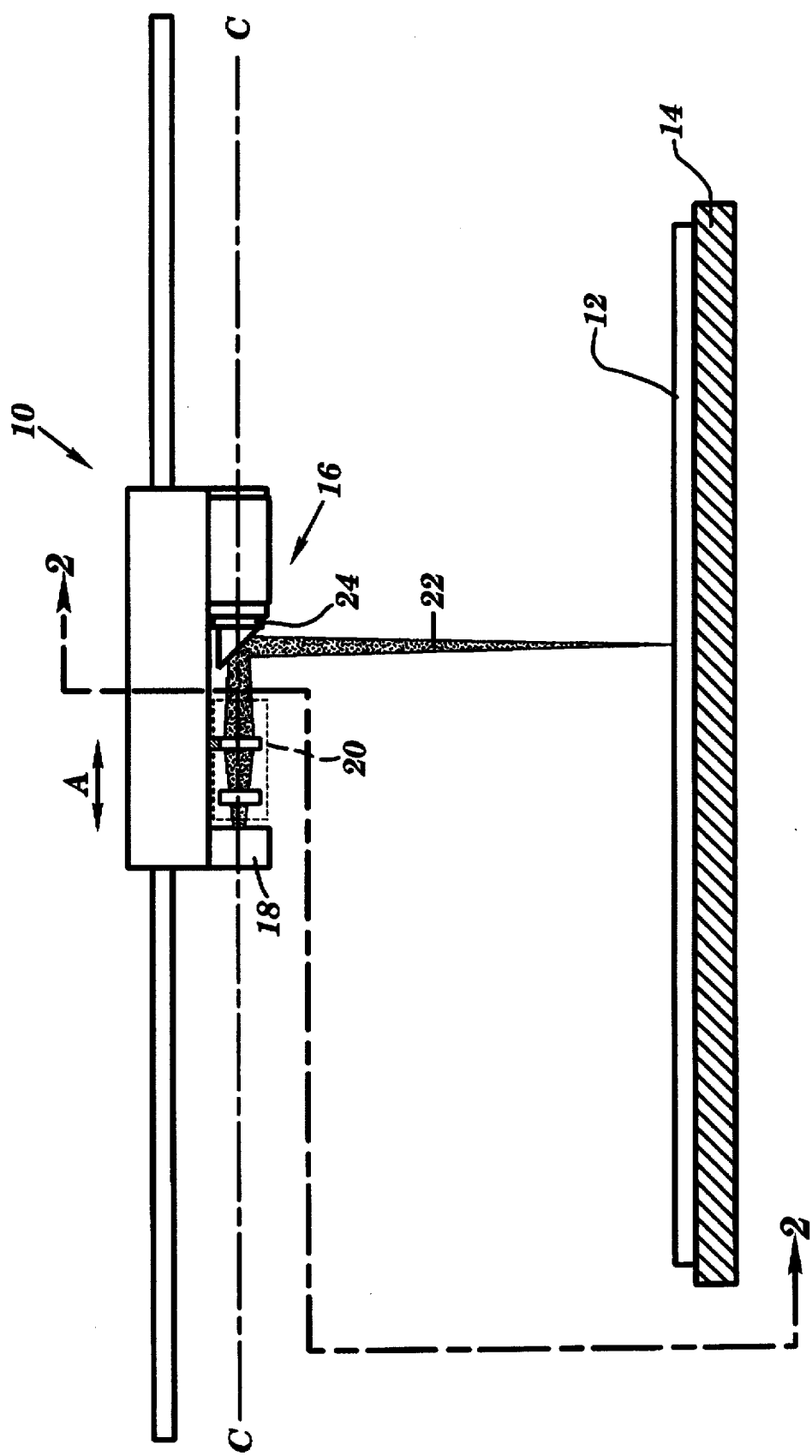
FIG. 1 is a side view of an imagesetter having a scanning exposure system according to the present invention.
Figure 2:
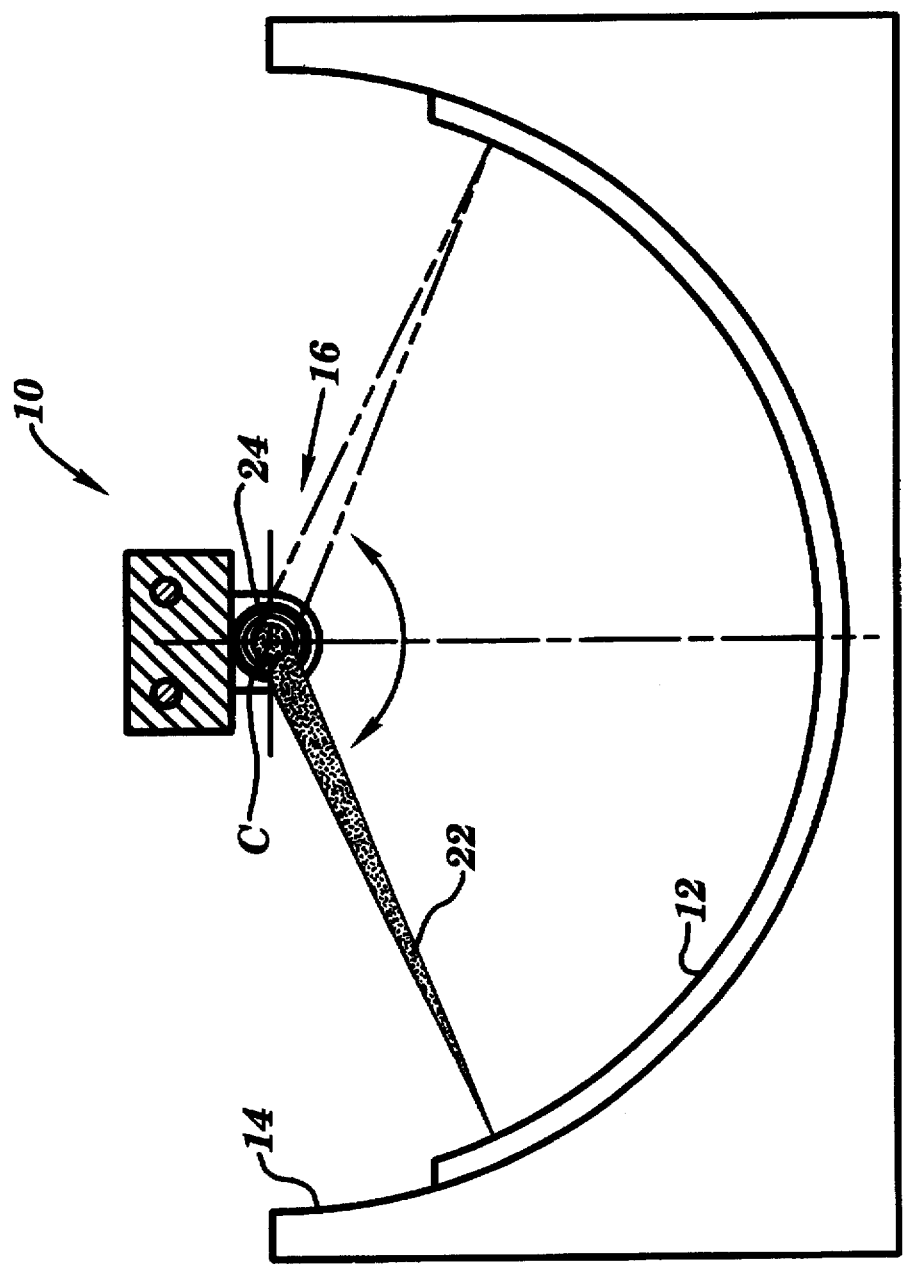
FIG. 2 is a partial sectional view of the imagesetter of FIG. 1 taken along line 2—2.

Referring to FIGS. 1 and 2, an imagesetter, generally indicated as 10, supports a photosensitive or radiation sensitive recording material 12 on a support surface 14 such as a flat platen, a capstan roller, or a cylindrical drum platen typical of known imagesetting devices. A scanning exposure system, generally indicated as 16 for line-wise exposure of the material comprises a light or radiation source 18 mounted a fixed distance away from the support surface 14, an optical system 20 located in between the light source 18 and the support surface 14 for focusing a beam 22 emitted by the light source 18 or an image of the light source 18 onto the material 12, and a beam deflecting apparatus 24 for line-wise scanning the beam 22 across the material 12 supported by the support surface 14. Relative motion between the scanning exposure system 16 and the material 12 is facilitated by mechanical means which are synchronized by electronic controls to line-wise scan the image data to be exposed onto the material on the support surface. In a capstan type imagesetter, such mechanical means typically comprise roller mechanisms to transport the material relative to the support surface during scanning. In the drum type imagesetter 10 depicted in FIGS. 1 and 2, the scanning exposure system 16 is moved along the axis C—C of the drum 14 by a precision linear drive mechanism while the material 12 remains motionless.

It will be appreciated by those skilled in the art that the photosensitive material can be replaced by an image or data retaining material to achieve input scanning in a similar manner by collecting and sensing the light reflected from or transmitted through the image retaining material. It will be understood that the following description of the present invention is applicable to such an input scanning mechanism.

In a detailed view of the first embodiment shown in FIG. 3, the optical system 32 located between the light source 18 and the support 14 has a coarse focusing system to position the image 33 (FIG. 4) of the light source 18 at the image receiving surface 30 (hereinafter focus the beam), ideally in the photosensitive or image retaining layer of the material. The material is available in different thicknesses so that one can select a particular material in accordance with the particular demands for the printing job. Because the position of the image receding surface 30 relative to the support 14 varies with the thickness of the material, coarse adjustment in focus of the optical system or position of the image of the light source can be made for material thicknesses such as 4 mils, 8 mils, 12 mils, etc. Also adjustments can be made to focus the beam at different depths or layers within the material if so desired, in the following manner.

The optical system comprises a lens 32 in the beam 22 that is adjustable longitudinally along the optical axis B—B with respect to the support 14, as indicated by arrow D. An adjustment mechanism 34 is used to translate the lens 32 longitudinally along the optical axis B—B with respect to the support 14 in order to focus the laser beam 22 or position the image 33 of the laser beam source 18 in the photosensitive layer 30 of the material 12. For a lens magnification ratio greater than 1.4 to 1, the longitudinal displacements D of the lens 32 usually result in approximately equal or greater longitudinal displacements of the light source image 33 at the image surface 30, as indicated by arrow E in the detail view (FIG. 4) of the light source image 33 at the material surface. Therefore, a relatively precise adjustment mechanism 34 is normally required to position the lens 32 to achieve coarse focusing of the beam 22 in the photosensitive layer 30.

For different thicknesses of material 12, the location of the photosensitive layer 30 relative to the support 14 changes, due to the varying thickness of the backing or support layer 36 in the material. Therefore, using the precision adjustment mechanism 34, the optical system can be calibrated experimentally and/or by a method of calculations to focus the beam within the photosensitive layer 30 for various thicknesses of the material 12. For example, given that there exists a known mathematical relationship between the change in longitudinal position of the lens $\Delta D$ and the change in longitudinal position of the focus of the system $\Delta E$, such as a ratio R, calibration of the system can be achieved by first determining the optimal focus E and resulting position D of the lens for a given material thickness T, by a trial and error process. Then the change in lens positions for other material thicknesses can be determined by the relationship $\Delta D = R\Delta T$, since the desired change in focus for the system is equal to the deviation from the thickness T of the material, $\Delta E = \Delta T$.

Once the optical system has been calibrated, an operator can select the lens 32 position from an operator control panel (OCP) 38. For example, the operator using a 4 mil thickness material, selects the lens position by entering the material thickness in the OCP 38. A controller 40 having the calibrated positions of the lens 32 according to the material thickness stored in memory, signals the precision adjustment mechanism 34 to adjust the lens 32 longitudinally along the optical axis B—B according to the position stored for a 4 mil thick material. As a result the beam 22 is automatically focused in the photosensitive layer 30 of the 4 mils thick material. Information can also be input to the controller 40 from a remote location, such as through a communication connection through a modem from a remote computer.

It will be understood by those skilled in the art that other optical elements (mirror, holographic, diffractive, binary, gradient index, etc.) can replace or be combined with the first lens for focusing the laser beam onto the material. Further the optical element or elements may be located before or after the beam deflecting apparatus. It will be appreciated that a variety of mechanisms can be used for the precision adjustment mechanism.

Figure 6:
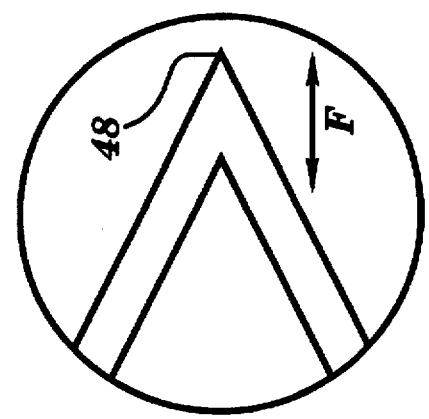
FIG. 6 is an enlarged view of section 6 in FIG. 5.
Figure 5:
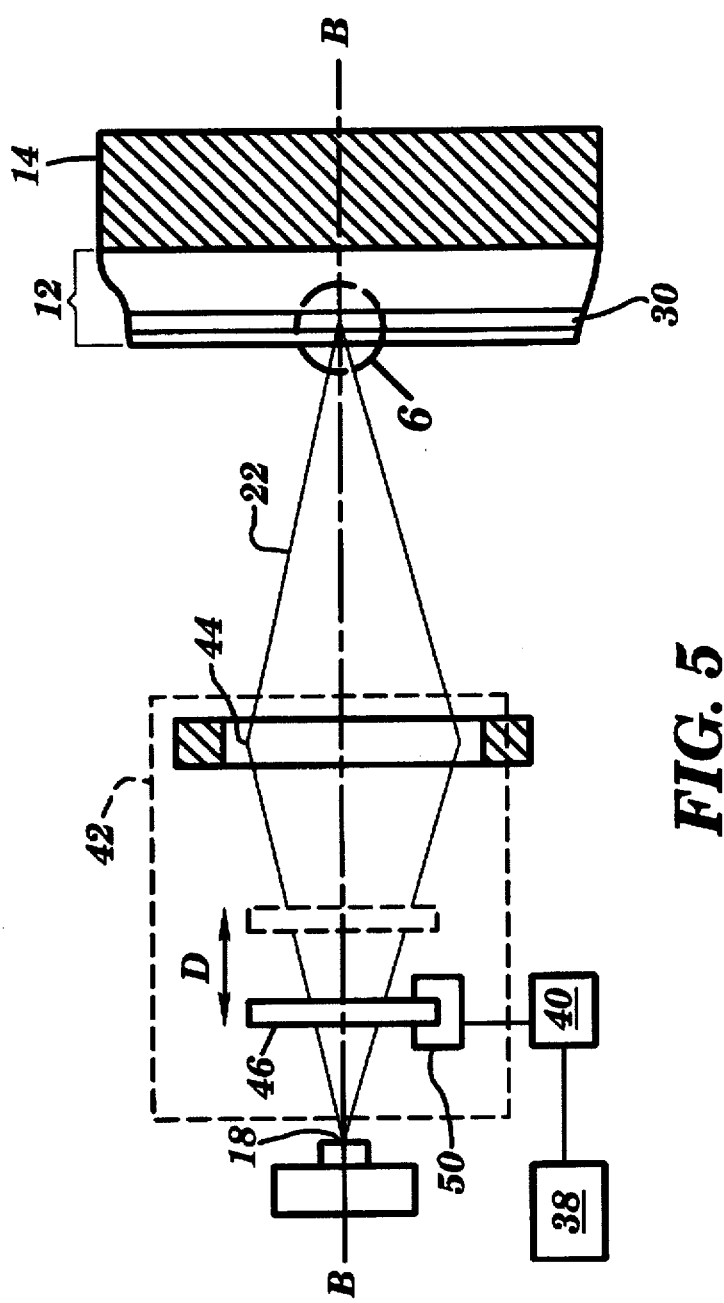
FIG. 5 is a diagrammatic view of a scanning system with a fine focusing system according to a second embodiment of the present invention.

In a second embodiment shown in FIG. 5, the optical system 42 located between the light source 18 and the support 14 has a fine focusing system to provide beam focus at the image receding surface 30 or photosensitive layer of the material by precise adjustment of the image 48 (FIG. 6) of the light source 18. Precise focus adjustments can be useful to optimize focus during calibration of an optical system, for re-focus for different material thicknesses, and for reducing sources of banding artifacts in the final output image which are extraordinarily sensitive to focus conditions. The optical system 42 has a first lens 44 in the beam path for focusing the beam 22 which is fixed in position relative to the light source 18 and to the support 14. A second lens 46 in the beam path is adjustable longitudinally along the optical axis B—B with respect to the first lens 44. The second lens 46 is a weak lens of long focal length relative to the first lens 44. The weak lens 46 can be a positive lens or a negative lens and can be positioned in the beam before, after, or internally to the first lens 44. Either or both lenses can be constructed using several lens elements as a lens group or groups. Because of the relatively long focal length of the second lens 46, substantial displacements of the second lens 46 along the optical axis B—B effect relatively small changes in the focal point 48 of the first and second lenses combined, or of the entire optical system 42. Longitudinal displacement of the weak lens 46 along the beam path produces a significantly smaller longitudinal displacement of the laser beam source image or focused beam position 48 at the image surface 30. In comparing the detailed view of the beam position in FIG. 4 with the exploded view of the beam position in FIG. 6, the displacement of the image 48 indicated by arrow F due to the adjustment of the weak lens 46 position is much smaller than the displacement of the image indicated by arrow E for approximately equal longitudinal adjustments D by the respective fine and coarse focusing systems.

Accordingly, an inexpensive and simple coarse adjustment mechanism 50 can be used to facilitate the displacement of the second lens 46 within the optical system 44. Due to the long focal length of the weak lens 46 any lateral displacement of the weak lens 46, in a direction generally perpendicular to the optical axis B—B, produces negligible effects on the optical system performance and alignment. Therefore, a less precise drive mechanism 50 is required for positioning the weak lens while tight constraints are maintained on the lateral position of the beam at the image surface 30. Both the weak lens 46 and the coarse adjustment mechanism 50 are inexpensive, lowering the cost of the focusing system of an imagesetter and enabling easy and low cost adjustments in manufacturing.

If the weak lens is placed in a diverging or converging beam, the design of the weak lens can be constrained such that the presence or absence of the weak lens at some longitudinal position along the optical axis does not disturb the focus of the optical system. Then an adjustable focus modification can be offered as a replaceable or upgradeable option in the optical systems of imagesetters and other devices, as described herein, or can be flipped into the optical path only when needed. Because of the long focal length of the weak lens relative to the system, this constraint on the lens design can be satisfied even with a single optical element without introducing significant wavefront distortion aberration to the beam.

As in the coarse focusing system described in the first embodiment of the invention, the fine focusing system is readily controlled by an operator. The operator controls the focus lens 46 position from the operator control panel (OCP) 38 and selects the focus lens position by entering the material thickness at the OCP 38. The controller 40 signals the coarse adjustment mechanism 50 to adjust the focus lens position longitudinally along the beam axis.

Referring now to FIG. 7, a preferred embodiment of an adjustment mechanism 42 will be described. The weak lens 46 is mounted in a lens holder 52 that is supported by two parallel leaf springs 54, one on each side of the lens holder 52. The leaf springs 54 are attached to a mounting plate 56 and to the lens holder 52 by screws 58 or by other suitable means. The lens holder 52 has a nut 60 rotationally fixed within a through bore 62. A flexible screw 64 engages the nut 60 to displace the lens mount 52 longitudinally upon rotation of the screw 64 by a mini-motor 66. The screw 64 can be driven forward or reverse to displace the weak lens 46 closer to or further away from the first lens 44. A longitudinal rectangular protrusion 68 on the lens holder 52 cooperates with a longitudinal rectangular groove 70 in the mounting plate 56 to guide the lens mount 52 longitudinally during movement of the lens mount 52 and maintain the lens 46 substantially perpendicular to the beam axis B—B. The leaf springs 54 bend as the lens mount 52 undergoes longitudinal movement, causing some transverse or lateral displacement of the weak lens 46 relative to the beam axis B—B. Due to the long focal length of the weak lens 46 the effects of any transverse displacement of the weak lens 46 are negligible for the optical system.

It will be understood by those skilled in the art that other optical elements (mirror, holographic, diffractive, binary, gradient index, etc.) can replace or be combined with the first lens for focusing the beam onto the material, and other optical elements can replace or be combined with the second lens to be adjustable relative to the fixed elements, provided that the combination of the adjustable optical elements has a combined focal length that is comparatively longer than the combined focal length of the fixed optical elements. Elements performing the function of a lens for electromagnetic or particle beam radiations are within the scope of the invention. It will be appreciated that a variety of mechanisms can be used to displace the weak lens with respect to the first lens without departing from the spirit of the invention.

While this invention has been described in terms of various embodiments, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What I claim and desire to secure by Letters of Patent of the United States are the following:

1. A scanning apparatus for reading or writing an image or other data on a material to be scanned with a scanning beam, comprising:
   a beam source for producing a beam;
   support for supporting said material to be scanned;
   first optical device for focusing the beam on the material, said first optical device including at least one optical element and having a fixed optical distance relative to said beam source and to said support;
   second optical device for fine focusing the beam on the material, said second optical device including at least one optical element and having a long focal length relative to the focal length of said first optical device; and
   controller for receiving a signal representing a thickness of the material and for automatically adjusting a position of said second optical device relative to the beam source and to said support to change the focus of the beam relative to the support in accordance with the received signal.

2. The apparatus according to claim 1, further comprising an input device for inputting data representing said thickness of said material into said controller.

3. The apparatus according to claim 1, wherein the adjustment of said second optical device is along a path of said beam.

4. The apparatus according to claim 1, wherein the second optical device has an optical axis and adjustment of said second optical device includes changing the direction of the optical axis.

5. The apparatus according to claim 2, wherein said input device includes an operator control panel.

6. The apparatus according to claim 2, wherein said input device includes a remote computer and a modem.

7. A scanning apparatus according to claim 1, further comprising a cantilevered member supporting said second optical device, wherein the position of said second optical device is adjusted by deflecting said cantilevered member.

8. A scanning apparatus according to claim 1, wherein the position of the second optical device is adjusted by radially moving the second optical device.

9. A scanning apparatus according to claim 1, further comprising a second support to which said first and said second optical devices are attached, wherein said second support is configured to be movable with respect to said material.

10. A scanning apparatus according to claim 1, further comprising:
    a device holder for mounting said second optical device; and
    a guide;
    wherein said device holder has a protruding portion which is configured to cooperate with said guide to direct said device holder along a path of said beam during adjustment of the position of the second optical device.

11. An optical system for fine focusing a beam, comprising:
    a beam source configured to direct a beam along a path;
    a support surface supporting a material to be scanned; and
    an optical assembly including a first lens positioned in the path of the beam, said first lens converging the beam to a focused spot near said support surface and having a fixed optical distance between the beam source and the support surface, and a second lens positioned between said beam source and said support surface, the position of said second lens being adjustable with respect to said beam source and said support surface, wherein the adjustment causes said second lens to move a distance along the path of the beam to thereby shift the focused spot along the path of the beam by a distance smaller than the movement distance of the second lens and the movement distance of the second lens corresponds to the thickness of the material.

12. The apparatus according to claim 11, wherein said second lens is adjusted with respect to said beam source and said support surface by an adjustment mechanism including a lens holder containing said second lens, a threaded nut fixed to said lens holder, a screw mating with said nut to cause linear displacement of said lens holder upon rotation of said screw, and a motor for rotating said screw.

13. The apparatus according to claim 11, wherein adjustment of said second lens causes a change in direction of an optical axis of the second lens.

14. A scanning apparatus according to claim 11, further comprising a cantilever supporting said second lens, wherein the position of said second lens is adjusted by deflecting said cantilever.

15. A scanning apparatus according to claim 11, wherein the position of the second lens is adjusted by radially moving the second lens.

16. A scanning apparatus according to claim 11, wherein said adjustable optical assembly is movable with respect to said material.

17. An optical system according to claim 11, wherein said adjustable optical assembly further includes:
   a moveable base;
   a first lens holder for fixedly mounting said first lens to said base and moveable therewith;
   a second lens holder for mounting said second lens to said base and moveable therewith; and
   a groove fixed to said base;
   wherein said second lens holder is configured to move the first lens relative to the second lens and has a protruding portion configured to be received by said groove to guide said device holder along the path of the beam during movement of the second lens relative to the first lens.

18. A scanning system for image reading or writing, comprising:
   a beam source configured to direct a beam along a path;
   a support surface configured to support a material to be scanned, said material having a thickness which is one of a plurality of thicknesses;
   a first optical element configured to focus the beam on the material and having a fixed optical distance relative to said beam source and to said support surface;
   a moveable second optical element configured to focus the beam on the material and having a focal length longer than that of said first optical element; and
   a controller configured to receive a signal representing the thickness of the material and to automatically control movement of the second optical element to change the focus of the beam relative to the support surface in accordance with the received signal.

19. The system according to claim 18, wherein the second optical element has an optical axis and the controlled movement of said second optical element includes changing the direction of the optical axis.

20. The system according to claim 18, further comprising:
   a moveable base configured to support and simultaneously move said first optical element and said second optical element during image reading or writing;
   a guide supported by the base; and
   a lens holder cantilevered from said base and having said second optical element disposed therein, said lens holder including a protrusion configured to cooperate with said guide to direct said device holder along the beam path during the controlled movement of said second optical element.

21. A method of scanning an image, comprising the steps of:
   directing a beam along a path;
   supporting a material to be scanned, said material having a thickness which is one of a plurality of thicknesses;
   focussing the beam on the material with a first optical element disposed in the path of the beam at a fixed distance from the support surface;
   focussing the beam on the material with a second optical element, having a focal length longer than that of said first optical element, disposed in and moveable along the path of the beam;
   transmitting a signal representing the thickness of the material;
   automatically moving the second optical element along the beam path to change the focus of the beam relative to the material so as to correspond to the thickness.

22. The method according to claim 21, wherein the second optical element has an optical axis and movement of the second optical element includes changing the direction of the optical axis.

23. The method according to claim 21, wherein movement of the second optical element is radial movement.

* * * * *